US008208370B1

(12) United States Patent
Mitchell, Jr. et al.

(10) Patent No.: US 8,208,370 B1
(45) Date of Patent: Jun. 26, 2012

(54) METHOD AND SYSTEM FOR FAST LINK FAILOVER

(75) Inventors: Albert H. Mitchell, Jr., San Jose, CA (US); Pritesh N. Patel, Fremont, CA (US); April Chou, Sunnyvale, CA (US); Mauricio Arregoces, Palos Verdes, CA (US); Christopher Spain, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 895 days.

(21) Appl. No.: 10/814,572

(22) Filed: Mar. 31, 2004

(51) Int. Cl.
*G06F 11/20* (2006.01)
*G01R 31/08* (2006.01)

(52) U.S. Cl. ........ 370/217; 370/225; 370/242; 709/239; 714/4.1; 398/2

(58) Field of Classification Search .......... 370/216–228, 370/242–245, 248, 250, 252, 256, 401, 230, 370/231, 239; 714/4, 40, 4.1–4.4; 709/201, 709/245, 231, 239, 225–227; 398/1–8; 455/450–452.2, 455, 456.2, 456.6
See application file for complete search history.

(56) References Cited

U.S. PATENT DOCUMENTS

| | | | |
|---|---|---|---|
| 4,387,371 A | 6/1983 | Beker et al. | 340/825 |
| 5,058,110 A | 10/1991 | Beach et al. | 370/85.6 |
| 5,371,852 A | 12/1994 | Attanasio et al. | 395/200 |
| 5,473,599 A | 12/1995 | Li et al. | 374/16 |
| 5,680,589 A | 10/1997 | Klingman | 703/23 |
| 5,822,512 A | 10/1998 | Goodrum et al. | 395/182.11 |
| 5,825,772 A | 10/1998 | Dobbins et al. | 370/396 |
| 5,872,783 A | 2/1999 | Chin | 370/392 |
| 5,959,968 A | 9/1999 | Chin et al. | 370/216 |
| 5,959,972 A * | 9/1999 | Hamami | 370/228 |
| 5,959,989 A | 9/1999 | Gleeson et al. | 370/390 |
| 5,978,852 A | 11/1999 | Myrick | 709/238 |
| 6,032,194 A | 2/2000 | Gai et al. | 709/239 |
| 6,058,238 A | 5/2000 | Yuasa | 386/46 |
| 6,064,671 A | 5/2000 | Killian | 370/389 |
| 6,108,300 A | 8/2000 | Coile et al. | 370/217 |
| 6,163,543 A | 12/2000 | Chin et al. | 370/400 |
| 6,181,681 B1 | 1/2001 | Hiscock et al. | 370/279 |

(Continued)

FOREIGN PATENT DOCUMENTS

CN 1407762 A 4/2003

(Continued)

OTHER PUBLICATIONS

Cisco Systems, Inc.; Copyright 1989-1997 © http://www.cisco.com/univercd/cc/td/doc/product/rtrmgmt/sw_ntman/cwsimain/cwsi2/cwsiug2/vlan2/stpapp.htm "Understanding Spanning-Tree Protocol," Appendix C, pp. C-1 through C-12.

(Continued)

*Primary Examiner* — Habte Mered
(74) *Attorney, Agent, or Firm* — Campbell Stephenson LLP (57) ABSTRACT

A method and system for fast link failover is disclosed. According to one embodiment, a method is provided in which a failure of a first link between a network element and an upstream portion of a communications network is detected, and a second link or group of links between the network element and a downstream portion of the communications network is responsively disabled to maintain a communications channel between the downstream and upstream portions of the communications network.

55 Claims, 4 Drawing Sheets

U.S. PATENT DOCUMENTS

| | | | | |
|---|---|---|---|---|
| 6,181,699 B1 | 1/2001 | Crinion et al. | | 370/392 |
| 6,195,351 B1* | 2/2001 | Hiscock et al. | | 370/389 |
| 6,202,114 B1 | 3/2001 | Dutt et al. | | 710/311 |
| 6,222,820 B1* | 4/2001 | Hamami | | 370/218 |
| 6,229,787 B1* | 5/2001 | Byrne | | 370/218 |
| 6,236,659 B1 | 5/2001 | Pascoe | | 370/404 |
| 6,243,360 B1 | 6/2001 | Basilico | | 370/231 |
| 6,275,953 B1 | 8/2001 | Vahalia et al. | | 11/16 |
| 6,285,656 B1* | 9/2001 | Chaganty et al. | | 370/228 |
| 6,298,061 B1 | 10/2001 | Chin et al. | | 370/400 |
| 6,377,992 B1 | 4/2002 | Fernández et al. | | 15/16 |
| 6,388,995 B1 | 5/2002 | Gai et al. | | 370/256 |
| 6,421,787 B1 | 7/2002 | Slaughter et al. | | 714/4 |
| 6,460,088 B1 | 10/2002 | Merchant | | 709/236 |
| 6,487,591 B1 | 11/2002 | Budhraja et al. | | 709/223 |
| 6,519,231 B1 | 2/2003 | Ding | | 370/256 |
| 6,535,490 B1 | 3/2003 | Jain | | 370/256 |
| 6,535,491 B2* | 3/2003 | Dutt et al. | | 370/256 |
| 6,567,403 B1 | 5/2003 | Congdon et al. | | 370/389 |
| 6,570,845 B1 | 5/2003 | Blanc et al. | | 370/218 |
| 6,657,973 B1 | 12/2003 | Arima | | 370/254 |
| 6,658,016 B1 | 12/2003 | Dai et al. | | 370/424 |
| 6,674,713 B1 | 1/2004 | Berg et al. | | 370/217 |
| 6,678,241 B1 | 1/2004 | Gai et al. | | 370/216 |
| 6,687,758 B2 | 2/2004 | Craft et al. | | 709/250 |
| 6,690,668 B1 | 2/2004 | Szczepanek et al. | | 370/392 |
| 6,697,339 B1 | 2/2004 | Jain | | 370/256 |
| 6,728,780 B1* | 4/2004 | Hebert | | 709/239 |
| 6,735,198 B1 | 5/2004 | Edsall et al. | | 370/389 |
| 6,735,205 B1 | 5/2004 | Mankude et al. | | 370/395.32 |
| 6,738,345 B1* | 5/2004 | Williamson | | 370/217 |
| 6,760,776 B1 | 7/2004 | Gallo et al. | | 709/238 |
| 6,804,721 B2 | 10/2004 | Wils et al. | | 709/230 |
| 6,810,421 B1 | 10/2004 | Ishizaki et al. | | 709/226 |
| 6,816,467 B1 | 11/2004 | Muller et al. | | 370/256 |
| 6,856,591 B1 | 2/2005 | Ma et al. | | 370/216 |
| 6,915,340 B2 | 7/2005 | Tanaka | | 709/220 |
| 6,938,095 B2 | 8/2005 | Basturk et al. | | 709/238 |
| 6,941,487 B1 | 9/2005 | Balakrishnan | | 714/4 |
| 6,980,534 B1 | 12/2005 | Nee et al. | | 370/329 |
| 6,981,174 B1* | 12/2005 | Hanning | | 714/5.1 |
| 7,042,855 B1 | 5/2006 | Gilchrist et al. | | 370/328 |
| 7,061,858 B1 | 6/2006 | Di Benedetto et al. | | 370/219 |
| 7,061,875 B1 | 6/2006 | Portolani et al. | | 370/219 |
| 7,126,923 B1 | 10/2006 | Yang et al. | | 370/256 |
| 7,127,633 B1* | 10/2006 | Olson et al. | | 714/4 |
| 7,130,305 B2 | 10/2006 | Kuukankorpiu | | 370/392 |
| 7,152,178 B1* | 12/2006 | Vook et al. | | 714/4.3 |
| 7,178,052 B2 | 2/2007 | Hebbar et al. | | 714/4 |
| 7,188,189 B2* | 3/2007 | Karol et al. | | 709/238 |
| 7,251,217 B2 | 7/2007 | Wong et al. | | 370/232 |
| 7,286,853 B2 | 10/2007 | Meier | | 455/560 |
| 7,502,865 B2 | 3/2009 | Seto | | 709/238 |
| 7,639,605 B2 | 12/2009 | Narayanan et al. | | 370/219 |
| 7,672,228 B1 | 3/2010 | Senevirathne et al. | | 370/219 |
| 7,818,628 B1* | 10/2010 | Bishara | | 714/43 |
| 2001/0014097 A1 | 8/2001 | Beck | | 370/401 |
| 2002/0016874 A1* | 2/2002 | Watanuki et al. | | 710/51 |
| 2002/0018489 A1 | 2/2002 | Ambe et al. | | 370/475 |
| 2002/0073338 A1 | 6/2002 | Burrows et al. | | 709/224 |
| 2002/0080720 A1 | 6/2002 | Pegrum et al. | | 709/232 |
| 2002/0087716 A1 | 7/2002 | Mustafa | | 709/236 |
| 2002/0089978 A1 | 7/2002 | Wang et al. | | 370/445 |
| 2002/0091755 A1 | 7/2002 | Narin | | 709/230 |
| 2002/0103921 A1 | 8/2002 | Nair | | 709/232 |
| 2002/0110148 A1 | 8/2002 | Hickman | | 370/475 |
| 2002/0126671 A1 | 9/2002 | Ellis | | 370/390 |
| 2002/0146008 A1 | 10/2002 | Kaplan | | 370/390 |
| 2002/0152320 A1* | 10/2002 | Lau | | 709/238 |
| 2002/0156612 A1 | 10/2002 | Schulter et al. | | 703/23 |
| 2002/0165981 A1 | 11/2002 | Basturk et al. | | 709/242 |
| 2002/0176450 A1 | 11/2002 | Kong et al. | | 370/401 |
| 2002/0184387 A1 | 12/2002 | Yamaya et al. | | 709/238 |
| 2002/0186654 A1* | 12/2002 | Tornar | | 370/225 |
| 2002/0188711 A1* | 12/2002 | Meyer et al. | | 709/223 |
| 2002/0196802 A1 | 12/2002 | Sakov et al. | | 370/432 |
| 2003/0007489 A1 | 1/2003 | Krishnan et al. | | 370/469 |
| 2003/0026248 A1 | 2/2003 | Hiroki | | 370/352 |
| 2003/0037165 A1 | 2/2003 | Shinomiya | | 709/238 |
| 2003/0051061 A1 | 3/2003 | Hank et al. | | 709/250 |
| 2003/0061533 A1 | 3/2003 | Perloff et al. | | 714/9 |
| 2003/0093557 A1 | 5/2003 | Giraud et al. | | 709/242 |
| 2003/0097470 A1 | 5/2003 | Lapuh et al. | | 709/239 |
| 2003/0110344 A1 | 6/2003 | Szczepanek et al. | | 711/100 |
| 2003/0142680 A1 | 7/2003 | Oguchi | | 370/400 |
| 2003/0152101 A1 | 8/2003 | Feng | | 370/445 |
| 2003/0169734 A1 | 9/2003 | Lu et al. | | 370/386 |
| 2003/0172147 A1 | 9/2003 | Chang et al. | | 709/223 |
| 2003/0198231 A1 | 10/2003 | Kalkunte et al. | | 370/395.31 |
| 2004/0057469 A1 | 3/2004 | Nuss et al. | | 370/535 |
| 2004/0066781 A1 | 4/2004 | Shankar | | 370/389 |
| 2004/0078621 A1 | 4/2004 | Talaugon et al. | | 714/4 |
| 2004/0098501 A1 | 5/2004 | Finn | | 709/236 |
| 2004/0105390 A1* | 6/2004 | Saksio | | 370/245 |
| 2004/0156390 A1 | 8/2004 | Prasad et al. | | 370/466 |
| 2004/0179507 A1 | 9/2004 | Batra et al. | | 370/343 |
| 2004/0208116 A1 | 10/2004 | Etienne et al. | | 370/216 |
| 2005/0036488 A1 | 2/2005 | Kalkunte et al. | | 370/389 |
| 2005/0041665 A1 | 2/2005 | Weyman | | 370/390 |
| 2005/0044186 A1 | 2/2005 | Petrisor | | 709/219 |
| 2005/0058063 A1* | 3/2005 | Masuyama et al. | | 370/217 |
| 2005/0063395 A1 | 3/2005 | Smith et al. | | 370/399 |
| 2005/0083933 A1 | 4/2005 | Fine et al. | | 370/390 |
| 2005/0089014 A1 | 4/2005 | Levin et al. | | 370/351 |
| 2005/0111483 A1 | 5/2005 | Cripe et al. | | 370/463 |
| 2005/0169311 A1 | 8/2005 | Millet et al. | | 370/471 |
| 2005/0193114 A1 | 9/2005 | Colby et al. | | 709/226 |
| 2005/0198371 A1 | 9/2005 | Smith et al. | | 709/238 |
| 2005/0243826 A1 | 11/2005 | Smith et al. | | 370/392 |
| 2005/0259646 A1 | 11/2005 | Smith et al. | | 370/389 |
| 2005/0265346 A1 | 12/2005 | Ho et al. | | 370/392 |
| 2006/0015643 A1 | 1/2006 | Orava et al. | | 709/238 |
| 2006/0215679 A1 | 9/2006 | Musoll et al. | | 370/412 |
| 2007/0154219 A1* | 7/2007 | Feinberg | | 398/104 |
| 2007/0159971 A1* | 7/2007 | Zhang et al. | | 370/230 |
| 2007/0180266 A1 | 8/2007 | Kang et al. | | 713/189 |
| 2009/0080431 A1 | 3/2009 | Rekhter et al. | | 141/26 |
| 2009/0134996 A1 | 5/2009 | White et al. | | 340/538 |

FOREIGN PATENT DOCUMENTS

| | | | | |
|---|---|---|---|---|
| EP | 1 035 685 | 9/2000 | | 12/18 |
| EP | 1 309 135 | 5/2003 | | |
| EP | 1 401 147 | 3/2004 | | 12/26 |
| GB | 2 362 538 | 5/2000 | | |
| WO | WO 00/72531 | 11/2000 | | |
| WO | WO 00/78004 | 12/2000 | | |
| WO | WO 02/01413 | 5/2001 | | |
| WO | WO 02/18965 | 3/2002 | | 31/8 |
| WO | WO03/081451 | 10/2003 | | |

OTHER PUBLICATIONS

Cited in U.S. Appl. No. 10/826,888 entitled "Distributed Multicast Forwarding in a Virtual Switch".

T. Stott, "Layer-2 Path Discovery Using Spanning Tree MIBs", Avaya Labs Research, Avaya, Inc., Mar. 7, 2002, pp. 1-23.

International Search Report as mailed from the PCT on Mar. 18, 2005, for International Application No. PCT/US2004/034851, 2 pages.

Michael R. Smith, Jeffrey YM Wang, Ali Golshan; "Port-Based Loadsharing for a Satellite Switch;" U.S. Appl. No. 10/690,348, filed Oct. 21, 2003.

News Release: "Cisco Raises the Bar in Stackable Switching, Introduces Catalyst 3750 Series with Cisco StackWise™ Technology;" 3 pages; http://newsroom.cisco.com/dlls/prod_041503b.html.

Cisco Catalyst 3750 Series Switches: "Cisco StackWise Technology White Paper;" 8 pages; http://www.cisco.com/en/US/products/hw/switches/ps5023lproducts_white_paper09186a00801b096a.shtml (Catalyst 3750 announced on Apr. 15, 2003.

Hewlett Packard, "LAN Aggregation Through Switch Meshing," XP-002284775, Jun. 1998, URL:http:/www.hp.com/rnd/library/pdf/techlib_meshing.pdf [retrieved on Jun. 16, 2004], 12 pages.

Huang, et al., "An Open Solution to Fault-Tolerant Ethernet: Design, Prototyping, and Evaluation," Performance . . . , 1999 IEEE International (Feb. 10-12, 1999), Scotsdale, AZ, XP010323654, ISBN 0-7803-5258-0, Feb. 10, 1999, pp. 461-468.

Michael Ward; "802.1S Solves Architecture Issues;" *Network World*, Aug. 4, 2003; 3 pages; http://www.nwfusion.com/cgi-bin/mailto/x.cgi.

Nortel Networks, "Split Multi-link Trunking," http://www.nortelnetworks.com/corporate/technology/smlt/, pp. 1-2 (printed Jul. 17, 2003).

Nortel Networks, "Split Multi-link Trunking FAQs," http://www.nortelnetworks.com/corporate/technology/smlt/faq.html, pp. 1-3 (printed on Oct. 21, 2003).

Cited in U.S. Appl. No. 10/833,377 entitled "Intelligent Satellite".

Knight, S. et al. Virtual Router Redundancy Protocol, IETF, Apr. 1998, 27 pages.

International Search Report dated Aug. 2, 2005, from related International Application No. PCT/US2004/029554, 6 pages.

Written Opinion of the International Searching Authority dated Aug. 2, 2005 from related International Application No. PCT/US2004/029554, 5 pages.

International Search Report dated Jan. 14, 2005 from corresponding International Application No. PCT/US2004/029553, 4 pages.

Written Opinion of the International Searching Authority dated Jan. 14, 2005 from corresponding International Application No. PCT/US2004/029553, 6 pages.

CIPO Examination Report in related Canadian Patent Application No. 2,534,511 dated May 1, 2006, 4 pages.

Cited in U.S. Appl. No. 12/183,347 entitled "Method and Apparatus for Detecting Support for a Protocol Defining Supplemental Headers".

Pedroso, Carlos Marcelo and Fonseca, Keiko, *Modeling Weight Round Robin Packet Scheduler With Petri Nets*, Communication Systems, IEEE, vol. 1, Nov. 25, 2002, pp. 342-345.

Liu, Dake, et al, *Configuration-Based Architecture for High Speed and General-Purpose Protocol Processing*, Signal Processing Systems, IEEE, Oct. 20, 1999, pp. 540-547.

D.T. Stott, "Layer-2 Path Discovery Using Spanning Tree MIBs", Avaya Labs Research, Avaya, Inc., Mar. 7, 2002, pp. 1-23.

Cisco Catalyst 3750 Series Switches: "Cisco StackWise Technology White Paper;" 8 pages; http://www.cisco.com/en/US/products/hw/switches/ps5023/products_white_paper09186a00801b096a.shtml (Catalyst 3750 announced on Apr. 15, 2003).

* cited by examiner

METHOD AND SYSTEM FOR FAST LINK FAILOVER

BACKGROUND OF THE INVENTION

1. Field of the Invention

The present invention relates generally to communications networks and more particularly to a method and system for fast link failover.

2. Description of the Related Art

Companies today depend increasingly on the ability to quickly and reliably access data via communications networks. As the accessibility, reliability, and availability of such communications networks has become more important, a number of techniques to increase these factors have been developed. Redundancy is one such technique frequently used to minimize network downtime and increase the speed at which data may be accessed via a communications network. For example, redundant network links or connections are frequently used to couple a single network element or node, (e.g., a client, server, or other host data processing system, a communications network appliance, or a switch, router, hub, gateway or other redistribution point) to one or more communications networks or portions thereof (e.g., network segments). Such use of redundant network links with respect to network elements residing at the edge or terminating point of a communications network is known as "multi-homing" and such redundantly-linked network elements are said to be "multi-homed".

Figure 1:
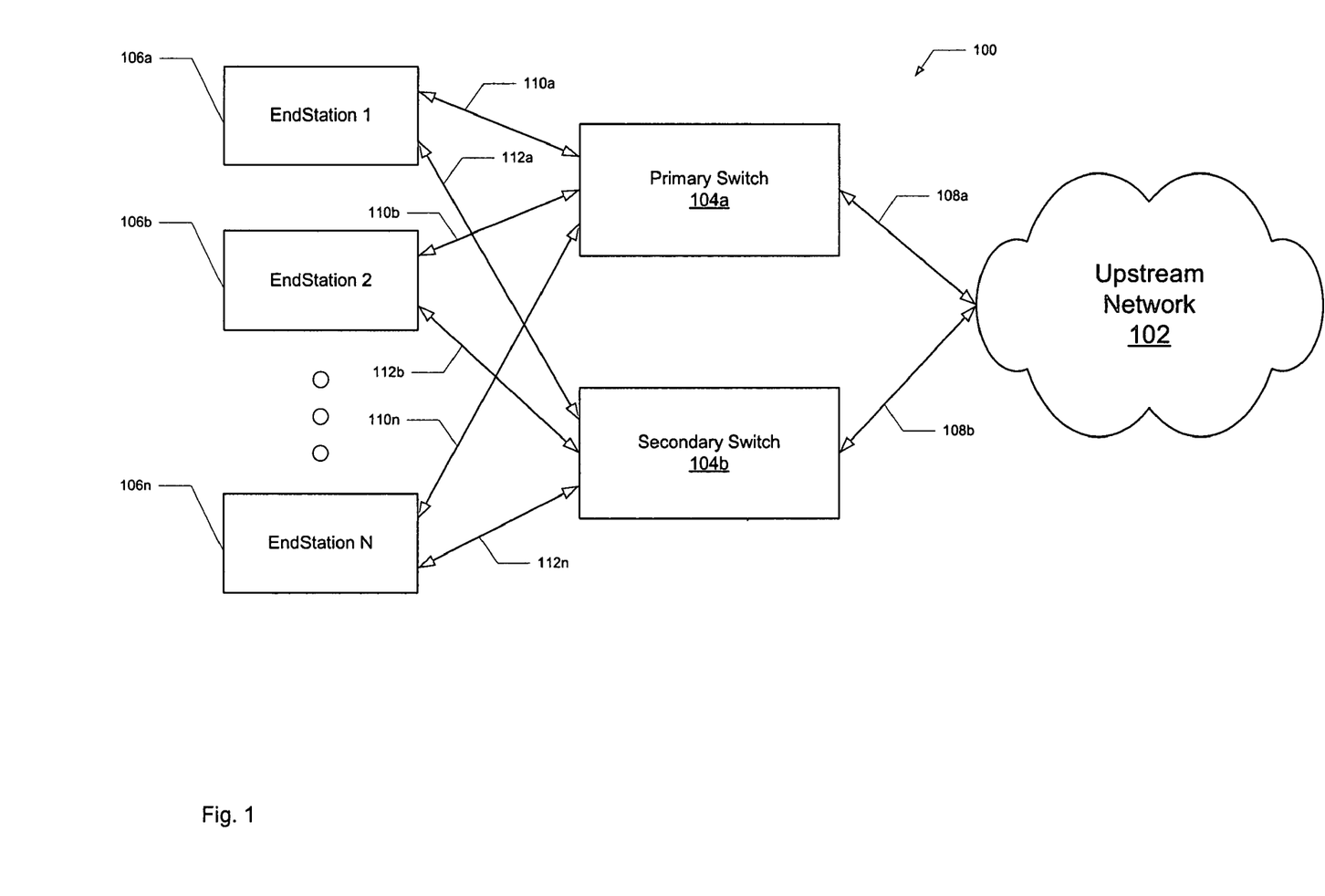
FIG. 1 illustrates a data processing system useable with one or more embodiments of the present invention.

FIG. 1 illustrates a data processing system including multi-homed network elements. Data processing system 100 of the illustrated embodiment includes an upstream communications network portion 102, a primary switch 104a, a secondary switch 104b, and a number of multi-homed network elements (e.g., multi-homed endstations 106a, 106b . . . 106n). Upstream communications network portion 102, including any of a number of network elements is coupled to primary switch 104a using a primary link 108a and to secondary switch 104b using a secondary link 108b. Multi-homed endstations 106a, 106b . . . 106n are each similarly coupled (e.g., via a primary network interface card or host bus adapter) to primary switch 104a via one of a plurality of primary links 110a-110n and (e.g., via a secondary network interface card or host bus adapter) to secondary switch 104b via one of a plurality of secondary links 112a-112n as shown.

In operation, data is transmitted between multi-homed endstations 106 and upstream communications network portion 102 using primary links 110a-110n, primary switch 104a, and primary link 108a. Following a failure of any of primary links 110a-110n, (e.g., due to failure of the physical link hardware, a primary network interface card, or primary switch 104a) one or more associated multi-homed endstations may failover to a corresponding secondary link 112a-112n by activating a network interface associated with the secondary link and deactivating a network interface associated with the failed primary link. Data is then transmitted between the multi-homed endstation which has failed over and upstream communications network portion 102 via an associated secondary link 112, a secondary switch 104b, and a secondary link 108b.

In a conventional communications network however, a failure of a link not directly attached to a network element (e.g., a failure of primary link 108a considered from the perspective of one or more of endstations 106a-106n) cannot be quickly detected. Traditionally, high-level system components (e.g., protocols, applications) have been utilized to detect the occurrence of such failures. For example, a high-level system component resident on an endstation 106 may use a timer to track a time period between data transfers associated with an upstream communications network portion or may use periodic link or connection status messages or "data units" to determine whether or not an upstream link failure has occurred.

The described techniques suffer from a number of significant shortcomings however. To account for ordinary communications network congestion and to avoid falsely declaring a link failure, the threshold time periods (and resultant latency) associated with the described techniques are typically multiple seconds or more. Additionally, such high-level system components frequently operate at an individual application or network element level. Consequently, failure of a link coupling an aggregating network element to an upstream communications network portion may not be simultaneously detected by all downstream network elements to which the aggregating network element is coupled.

SUMMARY OF THE INVENTION

Disclosed is a method and system for fast link failover. Using one or more embodiments of the present invention, network connectivity (e.g., data link layer connectivity) information is propagated, thereby enabling downstream network elements not immediately adjacent to the site of a link failure or directly coupled to a network element experiencing link failure to failover to alternate, redundant links such that the state of one or more connections or communications channels with the upstream portion(s) of a communications network may be preserved and the connection(s)/channel(s) may be maintained. According to one embodiment, a method is provided in which a failure of a first link between a network element and an upstream portion of a communications network is detected, and a second link between the network element and a downstream portion of the communications network is responsively disabled to maintain a communications channel between the downstream and upstream portions of the communications network using one or more alternate links.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

DETAILED DESCRIPTION

Although the present invention has been described in connection with one or more specific embodiments, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

According to one embodiment of the present invention, a method is provided in which a failure of a first link between a network element and an upstream portion of a communications network is detected and a second link (e.g., a group of links which are logically related to the first link) between the network element and a downstream portion of the communications network is responsively disabled to maintain a communications channel between the downstream and upstream portions of the communications network. While the second link is indicated as "down" or "disabled" to one or more network elements of the downstream portion of the communications network, in actuality the link is active and capable of transferring data between the downstream portion of the network and the network element. Disabling the second link however, serves to quickly notify network elements of the downstream portion of the communications network that a failure has occurred on an upstream link.

Using embodiments of the present invention, a link failure may be propagated within a bounded or predetermined period of time. For example, where embodiments of the present invention are implemented using predominantly special-purpose hardware (e.g., application specific integrated circuits, special-purpose processors, programmable logic devices, or the like) or specific (e.g., vectored) interrupts, a link between a network element and a downstream portion of a communications network may be disabled within a period of time substantially less than or equal to 50 milliseconds of detecting a failure of another link between the network element and an upstream portion of the communications network.

Using alternative embodiments of the present invention however a greater period of time for link failure propagation may be necessary. For example, where embodiments of the present invention are implemented using predominantly general-purpose hardware (e.g., one or more general-purpose processors) coupled with machine-executable instructions (e.g., data processing system software, firmware, or the like) or generic (e.g., polled) interrupts, a link between a network element and a downstream portion of a communications network may be disabled within a period of time substantially less than or equal to 2 seconds of detecting a failure of another link between the network element and an upstream portion of the communications network.

As the link state or link failure information is propagated downstream, downstream network elements with the capability to switch to alternate (e.g., redundant) links may do so, preserving higher-level communication channels between the downstream and upstream portions of the communications networks and providing seamless failover. Within the present description, the term "downstream" is intended to indicate in a direction from a network's core to a network's edge or towards a network's edge, the term "upstream" by contrast is intended to indicate in a direction from a network's edge to a network's core or towards a network's core. Further within the present description, the term "endstation" is intended to indicate a network element (e.g., a file/data server, personal computer, or other data processing system) residing at the edge of a communications network, the term "switch" is intended to indicate a data link layer network element (e.g., an Ethernet switch), the term "link" is intended to indicate a data link layer connection and may include one or more logical sub-links (e.g., an "Ether-Channel" or "Port-Channel"), and the term "failure" is intended to indicate the loss of a data link layer link.

Figure 2:
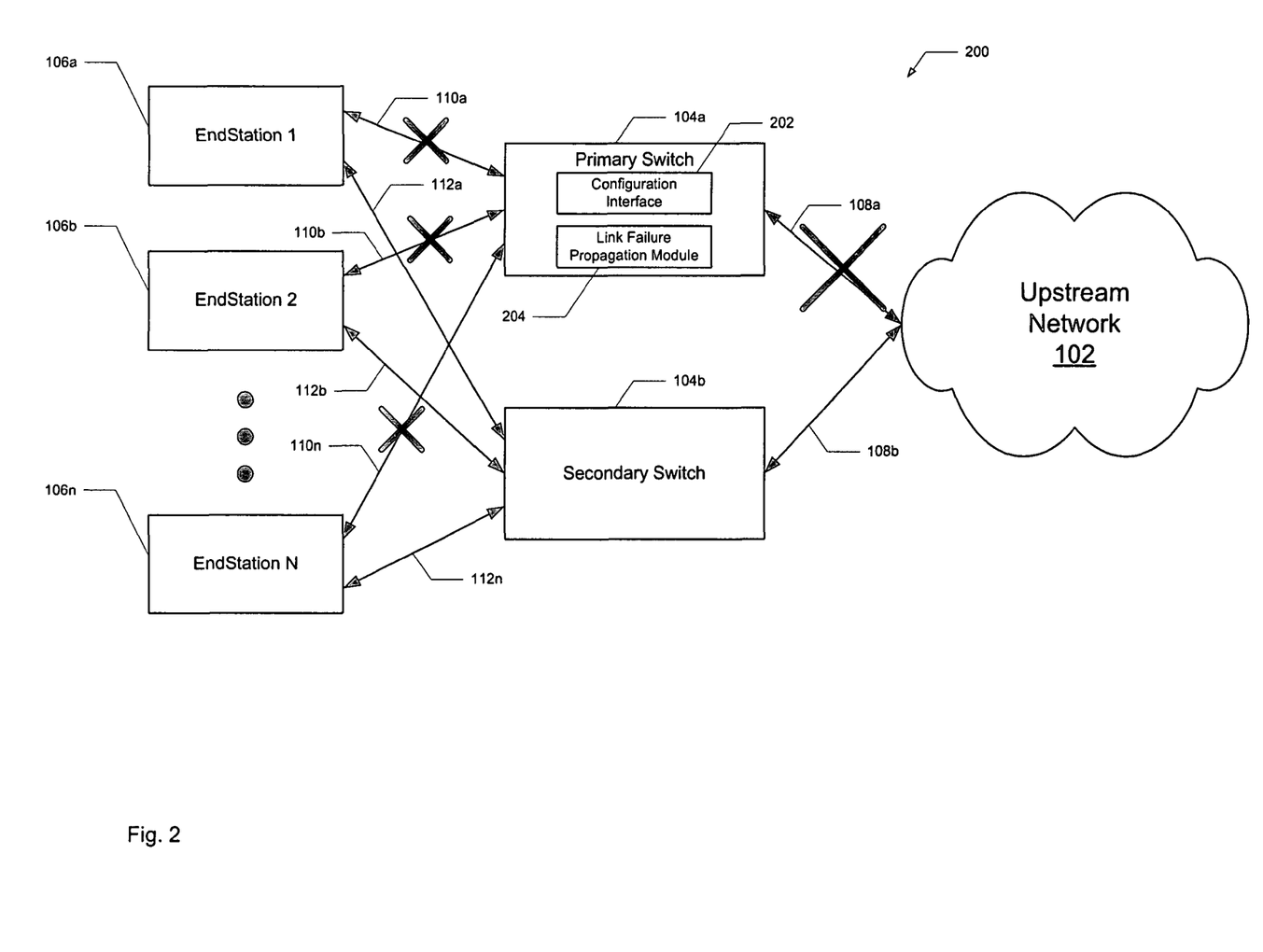
FIG. 2 illustrates a data processing system including a primary switch network element according to an embodiment of the present invention.

FIG. 2 illustrates a data processing system including a primary switch network element according to an embodiment of the present invention. As previously described with respect to FIG. 1, data processing system 200 of the illustrated embodiment of FIG. 2 includes an upstream communications network portion 102, a primary switch 104a, a secondary switch 104b, and a number of redundantly-linked network elements (e.g., multi-homed endstations 106a, 106b . . . 106n). Upstream communications network portion 102, (e.g., a network core, wide, metropolitan, or local area network, or the like) including any of a number of network elements is coupled to primary switch 104a using a primary upstream link 108a and to secondary switch 104b using a secondary upstream link 108b.

Multi-homed endstations 106a, 106b . . . 106n are each similarly coupled to primary switch 104a via one of a plurality of primary downstream links 110a-110n (e.g., via a primary network interface card or host bus adapter) and to secondary switch 104b via one of a plurality of secondary downstream links 112a-112n (e.g., via a secondary network interface card or host bus adapter) as shown. While links 108, 110, and 112 have been illustrated as direct connections between network elements (e.g., upstream communications network portion 102, primary and secondary switches 104, and endstations 106) in alternative embodiments, any of links 108, 110, and 112 may be wireless (e.g., using electro-magnetic, optical, infrared and/or acoustic signals or transmission media). For example, one or more of primary downstream links 110 and secondary downstream links are implemented in one embodiment of the present invention using a wireless local area network (e.g., IEEE 802.11x standard) communication protocol.

It will be appreciated that the use of the terms "upstream" and "downstream" within the present description is relative based upon the particular network element considered. For example, a link between primary switch 104a and endstation 106a is considered a "downstream" link from the perspective of primary switch 104a and an "upstream" link from the perspective of endstation 106a. Similarly, primary switch 104a may be considered an "upstream" network element from the perspective of endstation 106a and a "downstream" network element from the perspective of upstream communications network portion 102.

Moreover, a direct physical or virtual link or path need not exist between two network elements for an upstream/downstream relationship to exist and no network element need be coupled to a link for it to be considered "upstream" or "downstream". Consequently, even after primary downstream links 110 are disabled, an endstation 106 is still considered a downstream network element with respect to primary switch 104a.

In the illustrated embodiment of FIG. 2, primary switch 104a includes a configuration interface 202 and a link failure propagation module 204. While configuration interface 202 and link failure propagation module 204 have been illustrated in FIG. 2 as included within primary switch 104a, in an alternative embodiment of the present invention one or more of configuration interface 202 and link failure propagation module 204 maybe stored at or executed from a switch or other network element within data processing system 200 which is directly or indirectly coupled to one or more of endstations 106a-106n. In one embodiment, configuration interface 202 is used to provide a user interface for configuring link failure propagation module 204 and the operation thereof and link failure propagation module 204 is used to propagate link failure and/or link state as further described herein.

According to one embodiment, configuration interface 202 is configured to receive data from a user specifying various configuration parameters such as whether or not link failure propagation is to be enabled or not, and if enabled, how link failure propagation is to be performed (e.g., automatically or on demand, for one or more individually specified ports, for all ports associated with one or more specified virtual networks (e.g., virtual local area or storage area networks), or for all ports of a switch). In another embodiment of the present invention, configuration parameters additionally include data specifying what action is to be taken when a previously failed link (or a new link) becomes operational. For example, one or more associated endstations may alternatively "fail back" to a previous primary link which becomes operational again following a failure or the endstation(s) may continue to use a "failed over" secondary link or set of links.

In operation, data is transmitted between one or more of multi-homed endstations 106a-106n and upstream communications network portion 102 using primary downstream links 110a-110n, primary switch 104a, and primary upstream link 108a. Following a failure of primary upstream link 108a (e.g., due to failure of the physical link hardware, a network interface card, or primary switch 104a) link failure propagation module 204 of primary switch 104a is used to detect the failure and responsively disable one or more of primary downstream links 110a-110n.

According to the illustrated embodiment of FIG. 2, all downstream links or ports of primary switch 104a are disabled in response to the detection of a failure of primary upstream link 108a. In another embodiment, only those downstream links or ports which are individually predetermined or identified using configuration interface 202 are disabled, and in yet another embodiment, only those downstream links or ports associated with a virtual network such as a VLAN or VSAN which was predetermined or identified using configuration interface 202 are disabled. To disable one or more links according to embodiments of the present invention, any of a number of techniques may be implemented. For example, according to one embodiment of the present invention, a physical layer protocol circuit or "PHY" associated with one or more ports and/or links is disabled using an administrative command, causing all ports and/or links associated with the PHY to become disabled.

While the illustrated embodiment of FIG. 2 includes a single primary upstream link 108a and secondary upstream link 108b, in alternative embodiments of the present invention, multiple links between upstream communications network portion 102 and primary switch 104a and/or secondary switch 104b may be used. According to one embodiment, two or more primary upstream links between primary switch 104a and upstream communications network portion 102 are provided. Such primary upstream links may operate simultaneously or in a fail-over configuration with one another. Consequently, a failure of one or more of the primary upstream links need not cause any of downstream links 110 to be immediately disabled. For example, a downstream link 110 may be disabled only upon the failure of all primary upstream links, upon the failure of a predetermined or defined number or proportion of primary upstream links, or upon available bandwidth between primary switch 104a and upstream communications network portion 102 falling below a predetermined or defined threshold level due to the failure or one or more primary upstream links.

Once a port and/or link (e.g., one or more of downstream links 110) is disabled, an associated multi-homed endstation may failover to a corresponding secondary downstream link 112 by activating a network interface associated with the secondary downstream link and deactivating a network interface associated with the failed primary downstream link. Data is then transmitted between the multi-homed endstation which has failed-over and upstream communications network portion 102 via an associated secondary downstream link 112, a secondary switch 104b, and a secondary upstream link 108b.

Using one embodiment of the present invention, a network element (e.g., a datalink layer-capable Ethernet switch) is configured to track the state of a virtual network (e.g., a VLAN or VSAN) on all identified upstream interfaces (e.g., links, ports, interface cards, or the like). In the described embodiment, a virtual network can be available on multiple (but not necessarily all) upstream interfaces and can be associated with one or more downstream link(s). Consequently, downstream link(s) can be disabled when all upstream interfaces associated with a virtual network are disabled or failed (i.e., when there are no more upstream links that are members of a downstream port's virtual network). Any disabled downstream links are then re-enabled when an associated virtual network becomes available on any upstream interface.

Figure 3:
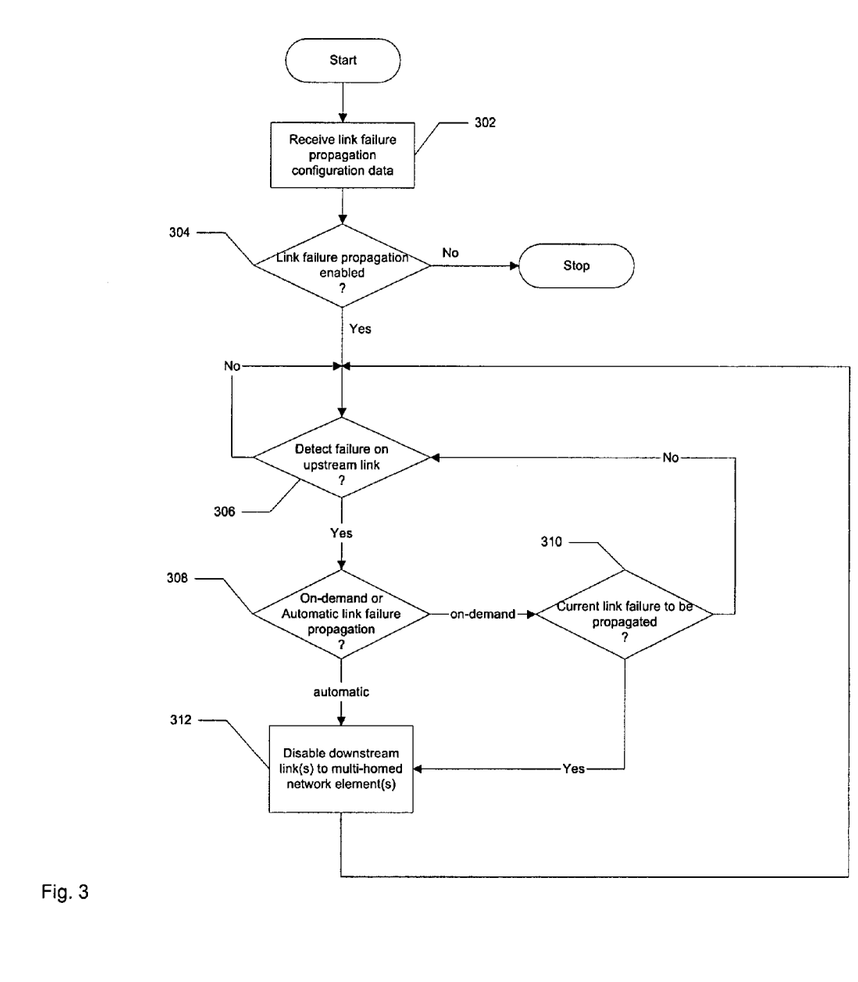
FIG. 3 illustrates a link failure propagation process according to an embodiment of the present invention.

FIG. 3 illustrates a link failure propagation process according to an embodiment of the present invention. While a particular order and number of process flowchart elements has been illustrated in the embodiment of FIG. 3, it should be appreciated that a greater or lesser number of process elements may be used and that the illustrated order may not necessarily be required. For example, in alternative embodiments of the present invention one or more process operations may be performed simultaneously or in parallel. In the illustrated embodiment, link failure propagation configuration data is initially received (process block 302) (e.g., using a configuration interface such as configuration interface 202 of FIG. 2). Thereafter a determination is made as to whether or not link failure propagation is enabled (process block 304). According to one embodiment, the determination of whether or not link failure propagation is enabled is made based upon received link failure propagation data. If a determination is made that link failure propagation is not enabled, the illustrated process is terminated as shown.

If a determination is made that link failure propagation is enabled on a system associated with the illustrated process embodiment, a loop is entered in which a failure of any upstream link of the associated network element is detected (process block 306). Once an upstream link failure has been detected, a determination is made whether link failure propagation is to be performed on-demand or automatically (process block 308). Where link failure propagation is to be performed on-demand, a determination is made whether or not the current link failure is to be propagated (process block 310) (e.g., in response to a response to a user prompt or lack thereof, or based upon additional processing or analysis of system or environmental attributes).

According to one embodiment of the present invention, a determination of whether or not a particular link failure is to be propagated on-demand is made by determining (e.g., using a timer) whether any user intervention has occurred within a predetermined amount of time from the occurrence of the link failure. If no user input or intervention is received within the predetermined amount of time in the described embodiment, a default behavior or action (e.g., propagation of the link failure) is performed. Otherwise, a behavior or action specified by the user input or intervention is performed. Where link failure propagation is to be performed automatically (or on-demand in a particular instance) one or more downstream links of a network element associated with the illustrated process embodiment are disabled (process block 312). Thereafter, or following a determination that a particular link failure instance is not to be propagated on-demand, the aforementioned loop is re-entered in which a failure of any upstream link s detected (process block 306)

Figure 4:
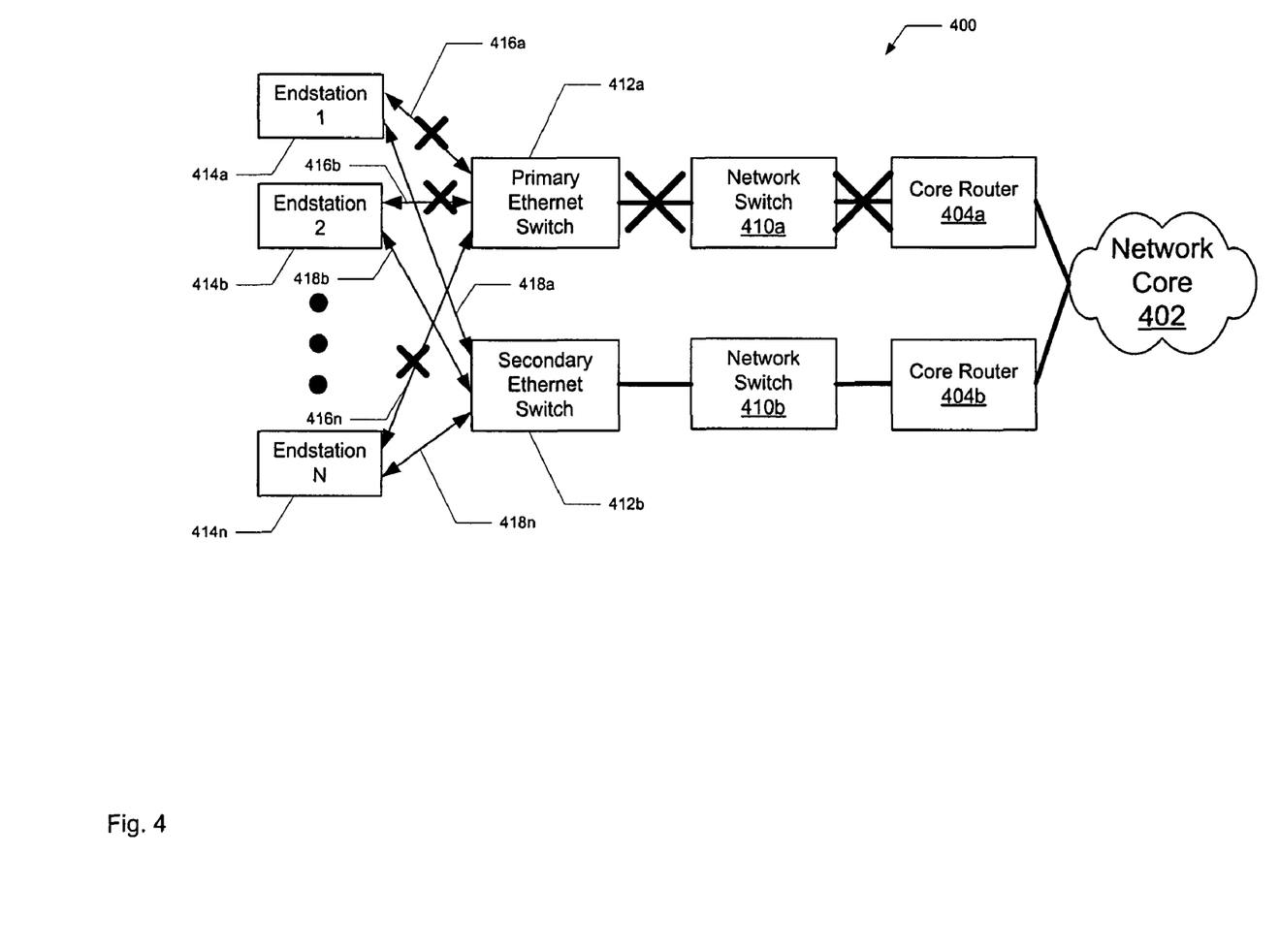
FIG. 4 illustrates a data processing system including a primary Ethernet switch network element according to an embodiment of the present invention.

FIG. 4 illustrates a data processing system including a primary Ethernet switch network element according to an embodiment of the present invention. In the illustrated embodiment of FIG. 4, a data processing system 400 is implemented including a core network 402, primary and secondary core routers (404a and 404b), primary and secondary network switches (410a and 410b), and primary and secondary Ethernet switches (412a and 412b) coupled together using a plurality of links and further including a plurality of multi-homed endstations 414a-414n similarly coupled to primary Ethernet switch 412a via one of a plurality of primary downstream links 416a-416n (e.g., via a primary network interface card or host bus adapter) and to secondary Ethernet switch 412b via one of a plurality of secondary downstream links 418a-418n (e.g., via a secondary network interface card or host bus adapter) as shown. Using one or more embodiments of the present invention, a failure such as that illustrated on a link between primary network switch 410a and core router 404a may be propagated downstream to one or more of endstations 414. Endstations 414 may include any of a number of network elements (e.g., management modules, processor blades, processor modules, or the like).

The foregoing detailed description has set forth various embodiments of the present invention via the use of block diagrams, flowcharts, and examples. It will be understood by those within the art that each block diagram component, operation and/or component illustrated by the use of examples can be implemented, individually and/or collectively, by a wide range of hardware, software, firmware, or any combination thereof.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   detecting a failure of a first link, wherein
      said first link is coupled between a first port of a network element and an upstream portion of a communications network,
      said first link comprises a first part of a communications channel between said upstream portion of said communications network and a downstream portion of said communications network, and
      said first port is associated with a virtual network;
   in response to said detecting said failure of said first link,
      identifying a second port of said network element that is associated with said virtual network, wherein
         a second link is coupled between said second port of said network element and said downstream portion of said communications network, and
         said second link comprises a second part of said communications channel, and
      disabling said second port of said network element;
   in response to detecting a recovery of said first link, re-enabling said second port of said network element; and
   in response to said re-enabling said second port, said communications channel failing back to said first link and said second link.

2. The method of claim 1, wherein
   said downstream portion of said communications network comprises a redundantly-linked network element.

3. The method of claim 2, wherein
   said redundantly-linked network element comprises a protocol stack including a first protocol stack layer and a second protocol stack layer,
   said first protocol stack layer is associated with one or more applications, and
   said disabling comprises notifying said second protocol stack layer of said failure.

4. The method of claim 3, wherein
   said network element comprises a primary network element,
   said method further comprises enabling a third link between said redundantly-linked network element and a secondary network element, and
   said secondary network element is coupled to said upstream portion of said communications network using a fourth link.

5. The method of claim 2, wherein said redundantly-linked network element comprises a multi-homed endstation.

6. The method of claim 2, wherein said network element comprises a datalink layer network element.

7. The method of claim 2, wherein said upstream portion of said communications network comprises a network layer network element.

8. The method of claim 2, further comprising:
   said redundantly-linked network element failing back to said second link when said first link and said second link become operational again.

9. The method of claim 1, wherein
said second port is not re-enabled, if said second port is configured to remain disabled in response to said detecting said recovery of said first link.

10. The method of claim 1, wherein said disabling said second port further comprises:
disabling a plurality of links between said network element and a plurality of redundantly-linked network elements, wherein said downstream portion of said communications network comprises said plurality of redundantly-linked network elements.

11. The method of claim 1, wherein said disabling said second port further comprises:
disabling a link of a plurality of links between said network element and a plurality of redundantly-linked network elements, wherein said downstream portion of said communications network comprises said plurality of redundantly-linked network elements.

12. The method of claim 1, wherein said disabling said second port further comprises:
disabling said second port of said network element within a period of time substantially less than or equal to 50 milliseconds of said detecting said failure of said first link.

13. The method of claim 1, wherein said disabling said second port further comprises:
disabling said second port of said network element within a period of time substantially less than or equal to 2 seconds of said detecting said failure of said first link.

14. The method of claim 1, wherein said second link is predetermined, using a configuration interface, to be automatically disabled in response to said detecting said failure of said first link.

15. The method of claim 1, wherein said disabling said second port further comprises:
determining, on-demand upon said detecting said failure of said first link, that said second port should be disabled, in response to analyzing a plurality of system attributes.

16. The method of claim 1, wherein
said detecting said failure of said first link further comprises
detecting a bandwidth of the first link falling below a predetermined threshold.

17. The method of claim 1, wherein
said second port of said network element is directly connected to said second link between said network element and said downstream portion of said communications network.

18. A network element comprising:
a processor; and
a memory coupled to said processor, said memory storing instructions executable by said processor to implement:
a link failure propagation module, configured to:
detect a failure of a first link, wherein
said first link is coupled between a first port of said network element and an upstream portion of a communications network,
said first link comprises a first part of a communications channel between said upstream portion of said communications network and a downstream portion of said communications network, and
said first port is associated with a virtual network;
in response to said detection of said failure of said first link,
identify a second port of said network element that is associated with said virtual network, wherein
a second link is coupled between said second port of said network element and said downstream portion of said communications network, and
said second link comprises a second part of said communications channel, and
disable said second port of said network element;
re-enable said second port of said network element, in response to a detection of a recovery of said first link; and
cause said communications channel to fail back to said first link and said second link, in response to said re-enabling said second port.

19. The network element of claim 18, wherein said downstream portion of said communications network comprises a redundantly-linked network element.

20. The network element of claim 19, wherein
said redundantly-linked network element comprises a protocol stack including a first protocol stack layer and a second protocol stack layer,
said first protocol stack layer is associated with one or more applications, and
said link failure propagation module is further configured to notify said second protocol stack layer of said failure.

21. The network element of claim 19, wherein
said network element comprises a primary network element,
said redundantly-linked network element is configured to enable a third link between said redundantly-linked network element and a secondary network element, and
said secondary network element is coupled to said upstream portion of said communications network using a fourth link.

22. The network element of claim 19, wherein said redundantly-linked network element comprises a multi-homed endstation.

23. The network element of claim 19, wherein said link failure propagation module is further configured to fail back said redundantly-linked network element to said second link when said first link and said second link become operational again.

24. The network element of claim 18, wherein said link failure propagation module is further configured to
disable a link of a plurality of links between said network element and a plurality of redundantly-linked network elements, wherein said downstream portion of said communications network comprises said plurality of redundantly-linked network elements.

25. The network element of claim 18, wherein said link failure propagation module is further configured to
disable said second port of said network element within a period of time substantially less than or equal to 50 milliseconds of said for detecting said failure of said first link.

26. The network element of claim 18, wherein said link failure propagation module is further configured to
disable said second port of said network element within a period of time substantially less than or equal to 2 seconds of said for detecting said failure of said first link.

27. The network element of claim 18, wherein said second link is predetermined, using a configuration interface, to be automatically disabled in response to said detecting said failure of said first link.

28. The network element of claim 18, wherein said link failure propagation module is further configured to determine, on-demand upon said detection of said failure of said first link, that said second port should be disabled, in response to analyzing a plurality of system attributes.

29. The network element of claim 18, wherein
said link failure propagation module is further configured to detect a bandwidth of the first link falling below a predetermined threshold.

30. A machine-readable non-transitory storage medium having a plurality of instructions executable by a machine embodied therein, wherein said plurality of instructions when executed cause said machine to perform a method comprising:
detecting a failure of a first link, wherein
said first link is coupled between a first port of a network element and an upstream portion of a communications network,
said first link comprises a first part of a communications channel between said upstream portion of said communications network and a downstream portion of said communications network, and
said first port is associated with a virtual network;
in response to said detecting said failure of said first link,
identifying a second port of said network element that is associated with said virtual network, wherein
a second link is coupled between said second port of said network element and said downstream portion of said communications network, and
said second link comprises a second part of said communications channel, and
disabling said second port of said network element;
in response to detecting a recovery of said first link, re-enabling said second port of said network element; and
in response to said re-enabling said second port, said communications channel failing back to said first link and said second link.

31. The machine-readable non-transitory storage medium of claim 30, wherein
said downstream portion of said communications network comprises a redundantly-linked network element.

32. The machine-readable non-transitory storage medium of claim 31, wherein
said redundantly-linked network element comprises a protocol stack including a first protocol stack layer and a second protocol stack layer,
said first protocol stack layer is associated with one or more applications, and
said disabling comprises notifying said second protocol stack layer of said failure.

33. The machine-readable non-transitory storage medium of claim 32, wherein
said network element comprises a primary network element,
said method further comprises enabling a third link between said redundantly-linked network element and a secondary network element, and
said secondary network element is coupled to said upstream portion of said communications network using a fourth link.

34. The machine-readable non-transitory storage medium of claim 31, wherein said redundantly-linked network element comprises a multi-homed endstation.

35. The machine-readable storage medium of claim 31, wherein said method further comprises:
said redundantly-linked network element failing back to said second link when said first link and said second link become operational again.

36. The machine-readable non-transitory storage medium of claim 30, wherein said disabling said second port further comprises:
disabling a link of a plurality of links between said network element and a plurality of redundantly-linked network elements, wherein said downstream portion of said communications network comprises said plurality of redundantly-linked network elements.

37. The machine-readable non-transitory storage medium of claim 30, wherein said disabling said second port further comprises:
disabling said second port of said network element within a period of time substantially less than or equal to 50 milliseconds of said detecting said failure of said first link.

38. The machine-readable non-transitory storage medium of claim 30, wherein said disabling said second port further comprises:
disabling said second port of said network element within a period of time substantially less than or equal to 2 seconds of said detecting said failure of said first link.

39. The machine-readable non-transitory storage medium of claim 30, wherein said second link is predetermined, using a configuration interface, to be automatically disabled in response to said detecting said failure of said first link.

40. The machine-readable non-transitory storage medium of claim 30, wherein said disabling said second port further comprises:
determining, on-demand upon said detecting said failure of said first link, that said second port should be disabled, in response to analyzing a plurality of system attributes.

41. The machine-readable non-transitory storage medium of claim 30, wherein
said detecting said failure of said first link further comprises
detecting a bandwidth of the first link falling below a predetermined threshold.

42. A data processing system comprising:
a redundantly-linked endstation; and
a network element configured to
detect a failure of a first link, wherein
said first link is coupled between a first port of said network element and an upstream portion of a communications network,
said first link comprises a first part of a communications channel between said upstream portion of said communications network and said redundantly-linked endstation, and
said first port is associated with a virtual network,
in response to detection of said failure of said first link,
identify a second port of said network element that is associated with said virtual network, wherein
a second link is coupled between said second port of said network element and said redundantly-linked endstation, and
said second link comprises a second part of said communications channel, and
disable said second port of said network element,
in response to detection of a recovery of said first link, re-enable said second port of said network element, and
in response to re-enabled said second port, fail back said communications channel to said first link and said second link.

43. The data processing system of claim 42, wherein
said network element comprises a primary network element, said redundantly-linked endstation is configured to enable a third link between said redundantly-linked endstation and a secondary network element, and said secondary network element is coupled to said upstream portion of said communications network using a fourth link.

44. The data processing system of claim 42, wherein said network element comprises an Ethernet switch.

45. The data processing system of claim 42, wherein said second link is predetermined, using a configuration interface, to be automatically disabled in response to said detecting said failure of said first link.

46. The data processing system of claim 42, wherein said network element is further configured to:

determine, on-demand upon said detection of said failure of said first link, that said second port should be disabled, in response to an analysis of a plurality of system attributes.

47. The data processing system of claim 42, wherein said redundantly-linked endstation is configured to fail back to said second link when said first link and said second link become operational again.

48. The data processing system of claim 42, wherein said network element is further configured to detect a bandwidth of the first link falling below a predetermined threshold as detection of said failure of said first link.

49. A data processing system comprising:

a primary network element, wherein a first port of said primary network element is coupled to an upstream portion of a communications network using a first link, a second port of said primary network element is coupled to a redundantly-linked endstation using a second link, said first link comprises a first part of a communications channel between said upstream portion of said communications network and said redundantly- linked endstation, said second link comprises a second part of said communications channel, said first port is associated with a virtual network, and said primary network element is configured to detect a failure of said first link, in response to detection of said failure of said first link, identify said second port of said primary network element that is associated with said virtual network, and disable said second port of said primary network element, and re-enable said second port of said primary network element coupled to said second link in response to detection of a recovery of said first link; and said redundantly-linked endstation, wherein said redundantly-linked endstation is configured to fail back to said communications channel comprising said second link in response to re- enabled said second port, and said primary network element is configured to fail back to said communications channel comprising said first link, in response to re-enabled said second port.

50. The data processing system of claim 49 further comprising:

a secondary network element, wherein said secondary network element is coupled to said redundantly-linked endstation using a third link, said redundantly-linked endstation is configured to enable said third link, in response to disabled said second port, said secondary network element is coupled to said upstream portion of said communications network using a fourth link, and said redundantly-linked endstation is configured to fail over to another communications channel comprising said third link and said fourth link, in response to disabled said second port.

51. The data processing system of claim 49, wherein said primary network element comprises an Ethernet switch.

52. The data processing system of claim 49, wherein said second link is predetermined, using a configuration interface, to be automatically disabled in response to said detecting said failure of said first link.

53. The data processing system of claim 49, wherein said primary network element is further configured to:

determine, on-demand upon detection of said failure of said first link, that the second port should be disabled, in response to an analysis of a plurality of system attributes.

54. The data processing system of claim 49, wherein said redundantly-linked endstation is configured to fail back to said second link when said first link and said second link become operational again.

55. The data processing system of claim 49, wherein said primary network element is further configured to detect a bandwidth of the first link falling below a predetermined threshold as detection of said failure of said first link.

\* \* \* \* \*